United States Patent [19]

Ruster

[11] Patent Number: 5,277,006

[45] Date of Patent: Jan. 11, 1994

[54] CABLE MANAGEMENT APPARATUS

[75] Inventor: Larry J. Ruster, Zeeland, Mich.

[73] Assignee: Herman Miller, Inc., Zeeland, Mich.

[21] Appl. No.: 642,325

[22] Filed: Jan. 18, 1991

[51] Int. Cl.[5] .............................................. E04B 2/00
[52] U.S. Cl. ................................. 52/220.7; 52/220.2;
52/239; 24/129 R; 24/132 R; 248/68.1;
248/74.2; 174/48; 174/99 R
[58] Field of Search ................... 52/220, 221, 238.1,
52/239, 287; 174/48, 49, 99 R; 101; 439/491,
719; 248/68.1, 89, 74.2; 211/8, 89; 16/50, 205,
231, 252, 277, DIG. 3, 13, 17, 43, 24/115 R,
115 A, 129 R, 132 R

[56] References Cited

U.S. PATENT DOCUMENTS

| | | | |
|---|---|---|---|
| 466,932 | 1/1892 | Cornell | 248/74.2 X |
| 944,731 | 12/1909 | Gold | 248/68.1 |
| 1,794,102 | 2/1931 | Comins | 52/221 |
| 2,275,109 | 3/1942 | McGee | 52/735 |
| 2,466,912 | 4/1949 | Rice | 24/129 R |
| 3,363,864 | 1/1968 | Olgreen | 248/74.2 X |
| 3,919,457 | 11/1975 | Steiner | 174/48 |
| 4,534,147 | 8/1985 | Cristell | 52/287 |
| 4,559,410 | 12/1992 | Hostetter | |
| 4,629,826 | 12/1986 | Thomas | 174/99 R |
| 4,874,322 | 10/1989 | Dola et al. | 174/49 X |
| 4,876,835 | 10/1989 | Kelley et al. | 52/28 X |
| 5,067,677 | 11/1991 | Miceli | 248/74.2 X |
| 5,085,384 | 2/1992 | Kasubke | 248/68 X |

FOREIGN PATENT DOCUMENTS 0174426 3/1986 European Pat. Off. .

Primary Examiner—Carl D. Friedman
Assistant Examiner—Robert Canfield
Attorney, Agent, or Firm—Willian Brinks Hofer Gilson & Lione

[57] ABSTRACT

A cable management apparatus is used in conjunction with a wall panel system having an internal space. The apparatus comprises a plate with spaced apart retainer members extending outward from the plane of the plate. Each retainer member defines at least a partial enclosure sufficient to prevent cables placed therein from slipping out laterally. The plate is fastened to the wall panel system at a desired location within the interior space to hold and separate cables.

38 Claims, 4 Drawing Sheets

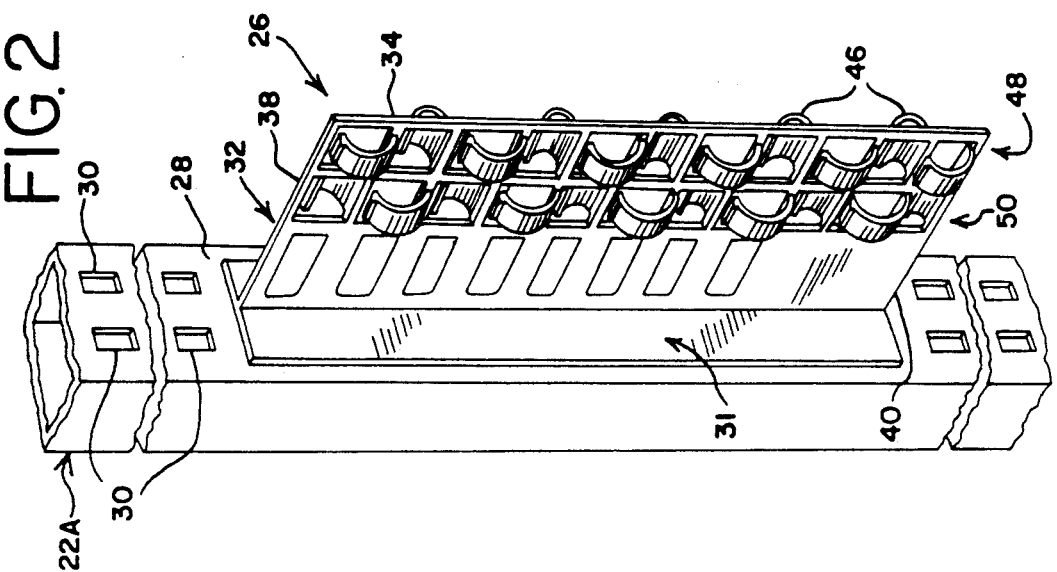
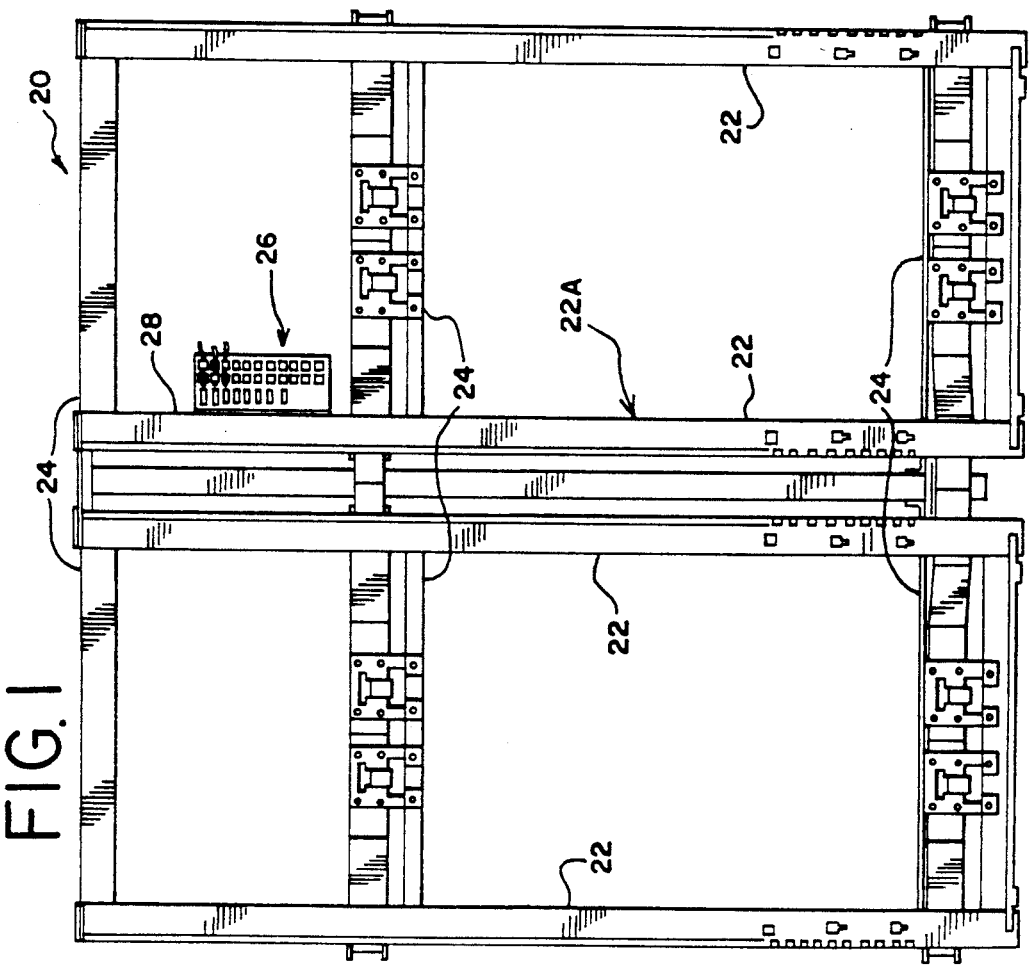

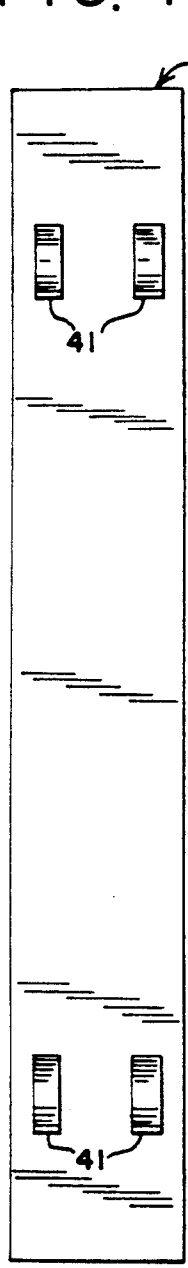
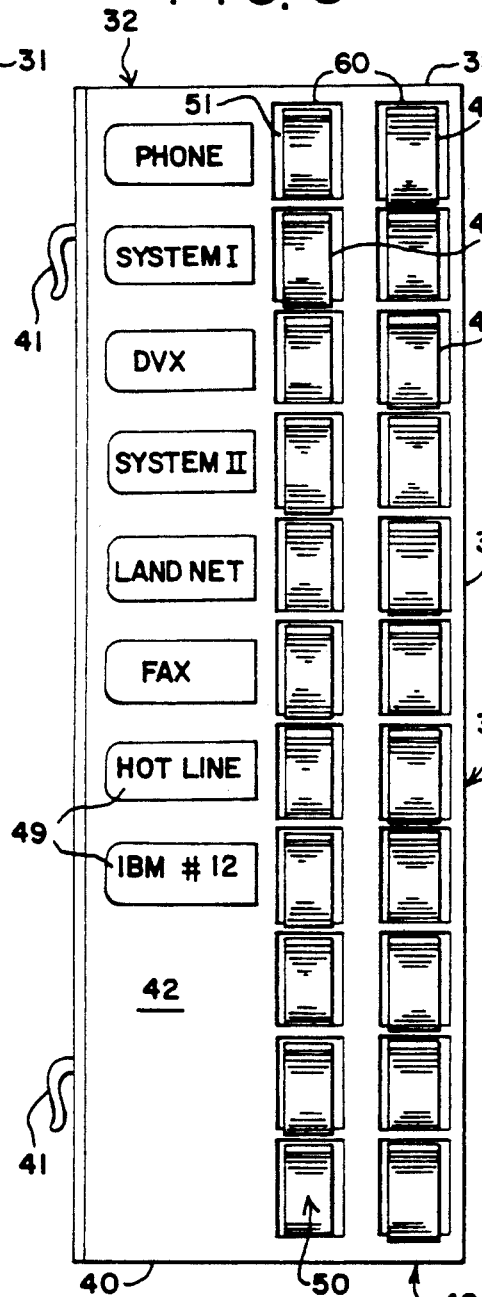
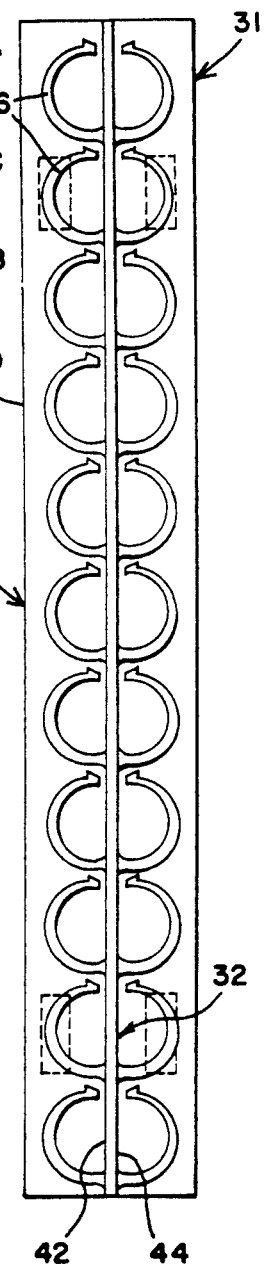
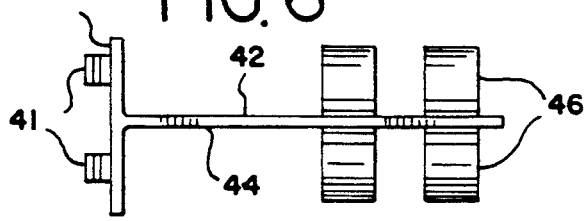

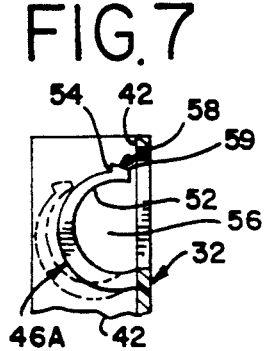
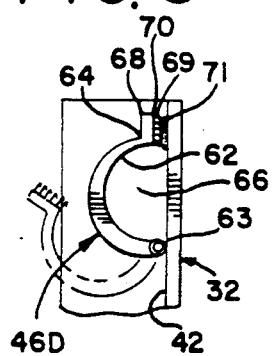
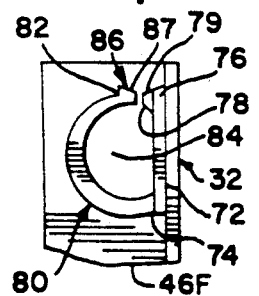
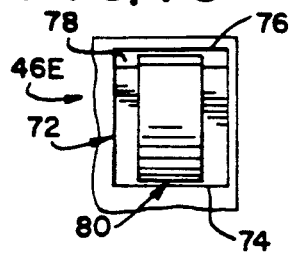
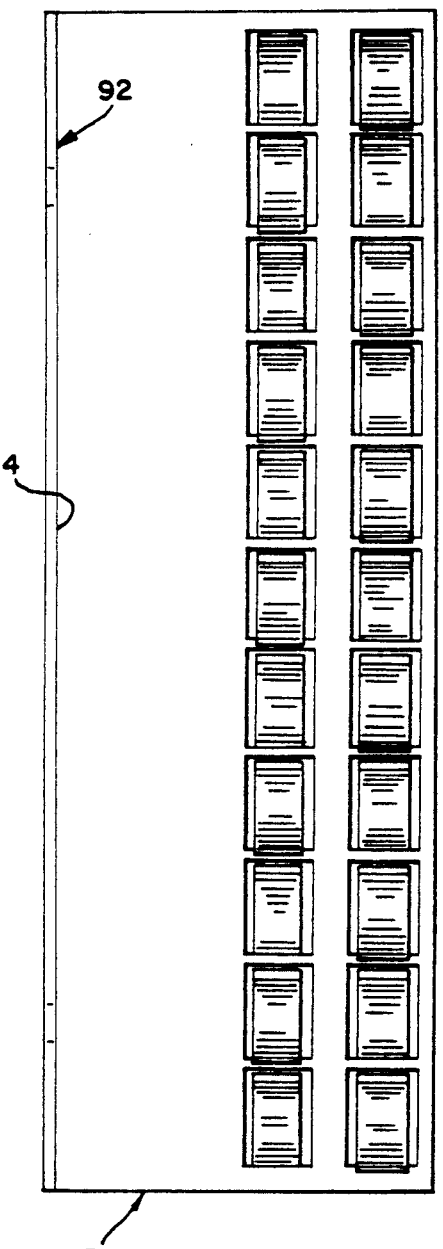
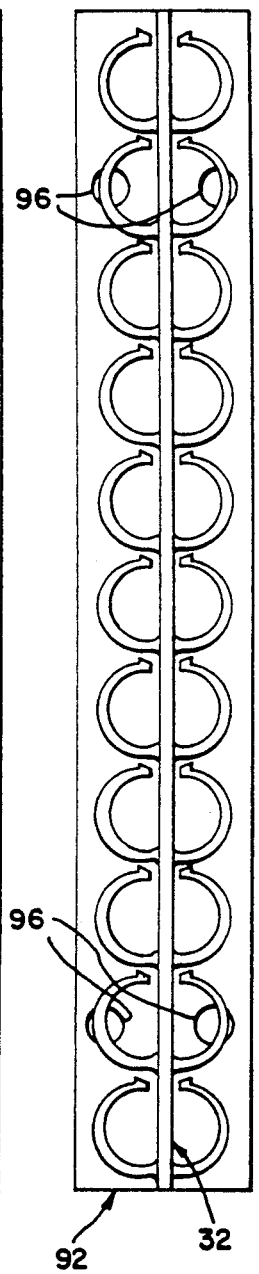

CABLE MANAGEMENT APPARATUS

BACKGROUND OF THE INVENTION

This invention relates generally to office panel systems, and more particularly, to an apparatus for holding and separating cables within an interior chamber therein.

The cable management apparatus may be used with a wall panel system of a type described in U.S. Pat. No. 4,876,835, the disclosure of which is specifically incorporated herein by reference.

Movable interior wall panel systems are frequently used in the office environment to subdivide a room into a variety of work stations. The number and configuration of these work stations can vary greatly depending on the requirements of a business or the needs of a particular worker. The flexibility provided by such a system also allows reconfiguration of the work stations to accommodate changing business conditions, personnel, or work processes.

In using wall panel systems, it is essential to provide electrical and communication service to the work stations. It is also desirable to house the various cables within the panel systems to enhance the aesthetic appeal of the office environment. Many wall panel systems incorporate modular, easily accessible, internal electrical distribution systems for supplying electrical power. However, communication and data cables servicing telephones, fax machines, computers, computer modems, and the like are often loosely laid inside these systems and tend to become entangled.

The disorganization of the cables which typically results can increase the cost of reconfiguring work stations or changing the work processes of a given work station. To do this, an electrician spends time searching through a bundle of cables to reassemble them in the desired arrangement.

The present invention is an attempt to overcome this deficiency by providing an apparatus which holds and separates cables for ready identification and access upon reassembly.

SUMMARY OF THE INVENTION

A cable management apparatus includes a retainer plate with spaced apart retainer members extending outward from the plate. Each retainer member defines at least a partial enclosure sufficient to prevent cables placed therein from slipping out laterally. Fastening means secure the retainer plate to an interior surface of a wall panel system at a desired location.

In one preferred embodiment, the retainer members extend outward from a front surface and back surface of the plate. The retainer members are also staggered to create rows parallel and adjacent a side edge of the plate, thus providing sufficient clearance for the cables to reach each retainer member, and providing space on the retainer plate for identification labels. In addition, the retainer members overlie corresponding apertures formed in the retainer plate, thus allowing ready identification of cables placed in retainer members extending from the back surface of plate.

Preferably, each retainer member has a closed position and an open position adapted to allow a desired number of cables to be laterally inserted or removed. Also, locking means releasably secures the retainer member in the closed position.

In a preferred embodiment, each retainer member and locking means comprises a resilient clasp biased in a direction toward the retainer plate, whereby the clasp is pulled outward, the cables are laterally placed in the enclosure, and the clasp is releasedm thus allowing it to return to its original position substantially enclosing the cables.

Preferably, the entire apparatus is molded in one piece. Alternatively, the retainer members can be separate and connected to the retainer plate by some other means, such as glue, bolts, or the like. Such separate retainer members preferably comprise a base which is connected to the retainer plate and a clasp which extends outward from the base.

The fastening means preferably comprises a support plate perpendicularly connected to a side edge of the retainer plate, and at least two anchors extending outward from and perpendicular to the support plate. This embodiment may be used in a wall panel system having vertical supports with slots therein for receiving the anchors to secure the plate.

In another embodiment, the fastening means comprises a flange extending from a side edge of the retainer plate, the flange having at least two apertures therein for receiving fasteners such as screws. In operation, the flange apertures are aligned with corresponding apertures in a wall panel system vertical support and the fasteners are inserted therein to secure the cable management apparatus to the support.

Yet another embodiment of the invention may be used with a wall panel system including a wall panel assembly having a panel connected to a substructure. The substructure defines an interior chamber for storing a plurality of cables and has a releasably secured front wall for access to the chamber. In this form of the invention, flanges depend from each side edge of the retainer plate to seat the plate horizontally on a floor within the chamber.

Thus, a simple cable management apparatus is provided which holds and separates a plurality of cables to ease the location and reassembly of cables when reconfiguring a work station or changing the work processes of a given work station.

BRIEF DESCRIPTION OF THE DRAWINGS

FIG. 1 is a front view of a first preferred embodiment of the invention shown attached to a wall panel system frame with the panels removed.

FIG. 2 is a perspective view of the embodiment in FIG. 1 shown connected to a vertical support member of a wall panel system.

FIG. 3 is a front view of the first preferred embodiment of the cable management apparatus.

FIGS. 4 and 5 are side views of the first preferred embodiment of the cable management apparatus.

FIG. 6 is a bottom view of the first preferred embodiment of the cable management apparatus.

FIG. 7 is a fragmentary cross-section of the first preferred embodiment of the invention showing one clasp in an open and closed position.

FIG. 8 is a fragmentary side view of an alternative embodiment of the invention showing one clasp in an open and closed position.

FIG. 9 is a fragmentary side view of another alternative embodiment of the invention showing one retainer member comprising a clasp and a base.

FIG. 10 is a front view of the retainer member shown in FIG. 9.

FIG. 11 is a front view of an alternative embodiment of the invention showing alternative fastening means.

FIG. 12 is a side view of the alternative fastening means shown in FIG. 11.

DETAILED DESCRIPTION OF THE PREFERRED EMBODIMENTS

Figure 13:
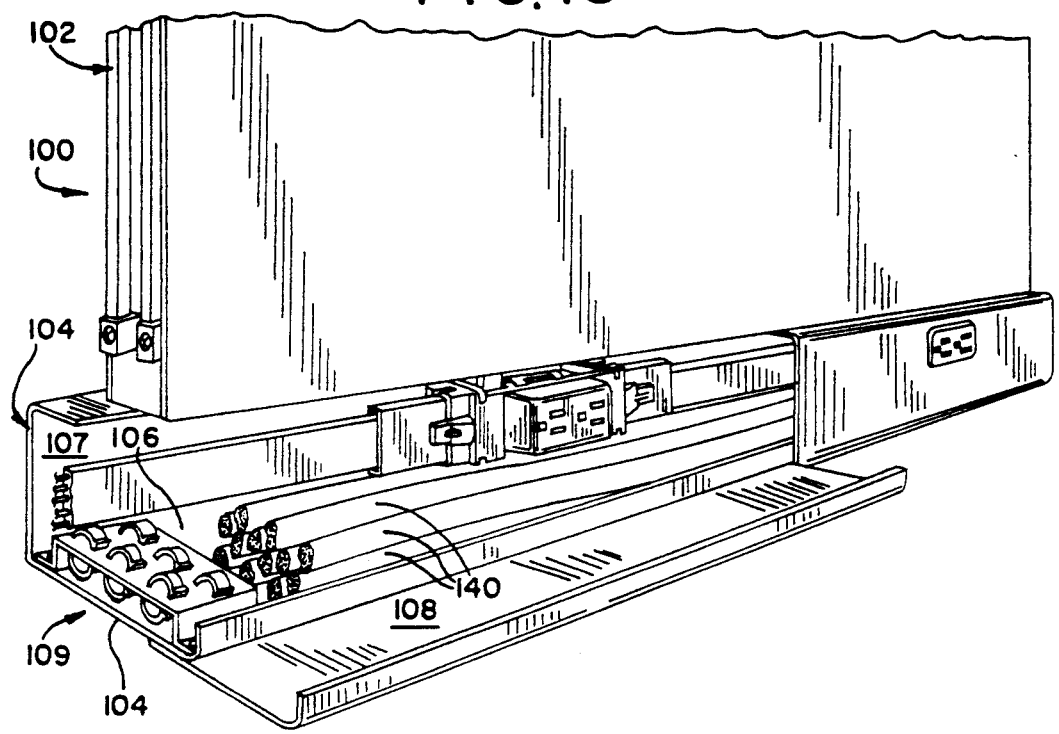
FIG. 13 is a perspective view of a further embodiment of the invention shown seated on a floor within a substructure of a wall panel system.

A cable management apparatus is used with a wall panel system having an internal space where cables can be laid, such as the one disclosed in U.S. Pat. No. 4,876,835, and such as those sold by the Assignee of the present invention under the names "Ethospace ®" and "Action Office Encore ®". FIG. 1 shows a frame of an Ethospace wall panel system, indicated generally at 20, with panels removed for clarity. The frame 20 has a plurality of horizontal cross-members 24 and vertical supports 22, of which 22A is shown in FIGS. 1 and 2. In FIGS. 1 and 2, the cable management apparatus is indicated generally at 26 attached to an interior surface 28 of vertical support 22A. To allow fastening at a desired location, vertical support 22A has a plurality of spaced apart apertures or slots 30 in vertical alignment along the length thereof.

FIGS. 2-6 illustrate a preferred embodiment of the invention. The cable management apparatus 26 includes a support plate 31 and a retainer plate 32. The retainer plate 32 extends perpendicularly outward from the center of support plate 31 and has a side edge 34 opposite the support plate 31, a top edge 38, a bottom edge 40, a front surface 42, and a back surface 44. A plurality of anchors 41 extend perpendicularly outward from the support plate 31 and bend substantially 90 degrees downward. As shown in FIG. 2, the cable management apparatus is secured to the vertical support 22A at a desired vertical location by slideably inserting anchors 41 into corresponding slots 30 of support member 22A at a desired vertical location. Any conventional means for securing retainer plate 32, with or without a support plate, to a desired location within a wall panel system can be used, such as bolts, screws, clips, adhesives, or the like.

In addition, a plurality of spaced apart retainer members 46, of which 46A-C are shown in FIG. 3, extend outward from the front surface 42 and back surface 44 of the plate 32. Although the retainer members 46 need not extend from both surfaces of the plate 32, utilizing both surfaces maximizes the number of unobstructed retainer members available, and consequently the number of cables which can be held.

Preferably, the retainer members 46 are staggered to create a first row 48 and second row 50 on the front surface 42 and back surface 44 of the plate 32, each row being parallel to the side edges of the plate 32. The distance between adjacent retainer members 46 in a row is substantially the same as the length of the staggered retainer member 46 in the other row. This orientation is illustrated in FIG. 3, wherein the distance between adjacent retainer members 46A and 46B in row 48 is substantially the same as the length of staggered retainer member 46C in row 50. Staggering the retainer members 46 in this manner provides a continuous series of unobstructed retainer members along the entire length of both surfaces of the plate 32. In addition, the spaces between the retainer members 46 in a row provide sufficient clearance for the opening and closing of each retainer member.

Another feature of the first preferred embodiment is that the first row 48 is adjacent side edge 34, and the second row 50 is adjacent the first row 48 and spaced apart from the support plate 31. Thus, labels 49 can be placed on the front surface 42 of retainer plate 32 adjacent each retainer member 46 to identify the cables placed therein, and the cables can reach the retainer members 46 with a minimal amount of bending around vertical support 22A.

Although the foregoing arrangement of the retainer members 46 is a preferred embodiment of the invention, the retainer members 46 can be positioned on either surface of the plate 32 in any manner as long as they are reachable by the cables.

Retainer member 46A, shown in FIGS. 3 and 7, illustrates a preferred configuration of the retainer members 46. Retainer member 46A comprises a resilient, substantially semicircular clasp 52 which extends from the front surface 42 of plate 32 and terminates in an end 54 adjacent said surface. Clasp 52, shown in dotted lines in an open position in FIG. 7, is biased in a direction toward the front surface 42 of the plate 32. In a closed position, clasp 52 defines a substantial enclosure 56 sufficient to prevent cables placed therein from slipping out laterally. In addition, a tab 58 extends outward from the end 54 and has a surface 59 facing plate 32 which recedes at an angle away from the plate.

In operation, tab 58 is pulled outward, the cables are removed from or placed in the enclosure 56, the tab is released, and the clasp 52 returns to its original position. If the cables are not too large relative to the clearance between the tab 58 and the plate 32, tab surface 59 allows the cables to be forcibly slid into the enclosure 56, whereby the clasp is forced outward during insertion and snaps back into place after insertion.

Still another feature of the first preferred embodiment is illustrated in FIGS. 3 and 7. The retainer members 46 overlie corresponding apertures 60 formed in retainer plate 32. Apertures 60 are substantially the same length as and preferably wider than the retainer members 46, although the apertures may be any size. These apertures allow ready identification of cables which are placed in the retainer members 46 extending from the back surface 44 of plate 32.

The retainer members 46 can be made in many different configurations and can have various material properties. Preferably, the entire apparatus is injection molded using a fire retardant, resilient material such as No. 59300 sold by B. F. Goodrich under the name "Estaloc ®". The retainer members 46 can be any shape, and a tab need not be provided. They can define a complete enclosure and can be rigid, pliant, or elastic. They can be made of a different material than the retainer plate 32 and can be attached thereto by conventional means. Referring again to FIG. 7, end 54 can be integrally connected to the plate 32 and cables can be inserted longitudinally through the enclosure 56, although it is desirable that the clasp have a closed position and an open position adapted to allow lateral insertion of the cables in the enclosure without having to thread the cables.

A retainer member which is movable between an open and closed position can comprise any conventional means, such as a pliant or elastic clasp, or a rigid clasp in conjunction with a hinge. Likewise, any conventional means for securing the end 54 to the plate 32 can be used, such as a bolt, screw, pin, snap, hook, Velcro-type surface, or the like.

FIG. 8 illustrates an alternative embodiment of the retainer members 46 in a side view of a single retainer member 46D. Retainer member 46D includes a substantially semicircular clasp 62 which is connected to the front surface 42 by a hinge 63, and which terminates in an end 64. Clasp 62, shown in dotted lines in an open position, has a tab 68 which extends outward from the end 64 and is coplanar with the plate 32 when the clasp 62 is in a closed position. Hook type members 69, which form the hook part of hook and loop fasteners commonly sold under the trademark VELCRO®, are placed on a bottom surface 70 of the tab 68 with adhesive. Loop type material 71 is placed on the front surface 42 of the plate 32, so that placing the surfaces of the hook members 69 against the surface of the loops 71 secures the tab 68 to the front surface 42 of plate 32 and creates a complete enclosure 66. Of course, the hook and loop fasteners can be reversed. In operation, the tab 68 is pulled outward, the cables are placed in the enclosure 66, and the clasp is closed and secured by placing the hook members 69 against the loop members 71.

FIGS. 9 and 10 illustrate another alternative embodiment of the retainer members 46 in a top and side view of a single retainer member 46E. Retainer member 46E comprises a base 72 and a semicircular, resilient clasp 80. The base 72 has a bottom edge 74, a top edge 76, and a lip 78 protruding outward from the top edge 76. Clasp 80 extends upward from the back edge 74 of the base 76 and terminates in an end 82 adjacent the lip 78 to create a substantial enclosure 84. A tab 86 extends outward from the end 82 and has a surface 87 facing the plate 32 which recedes at an angle away from the plate. In addition, lip 78 has a surface 79 facing outward which recedes at an angle toward the enclosure 84.

In operation, as in the first preferred embodiment, tab 86 is pulled outward, the cables are removed from or placed in the enclosure 84, the tab is released, and the clasp 80, which is biased in a direction toward the lip 78, returns to a closed position. Alternatively, the angle of lip surface 78 and tab surface 87 allows cables to be forcibly inserted into enclosure 84, whereby the clasp is forced outward during insertion and snaps back into place after insertion. Lip 78 also prevents the cables from slipping out of the enclosure 84. In addition, the base 72 may be adhesively attached to the plate 32, or it may be connected by bolts, rivets, an insert, or the like.

FIGS. 11 and 12 show an alternative embodiment of the means for fastening the plate to a vertical support 22. In this form of the invention, a flange 92 extends perpendicularly from a side edge 94 of plate 32, and has a plurality of apertures 96 for receiving fastening means (not shown), such as a bolt, screw, clip, or the like. Similarly to the embodiment shown in FIG. 2, the cable management apparatus 26 is secured to the vertical support 22A at a desired vertical location by aligning the flange apertures 96 with the vertical support apertures 30 and placing fastening means therein.

Figure 14:
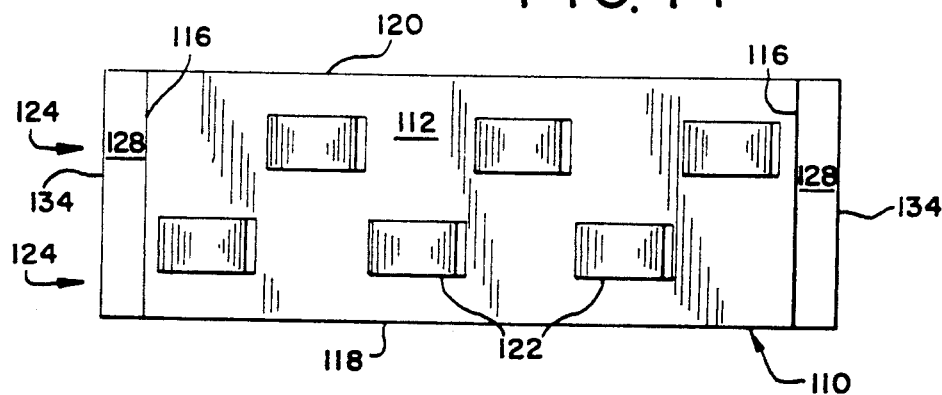
FIG. 14 is front view of the embodiment shown in FIG. 13.
Figure 15:
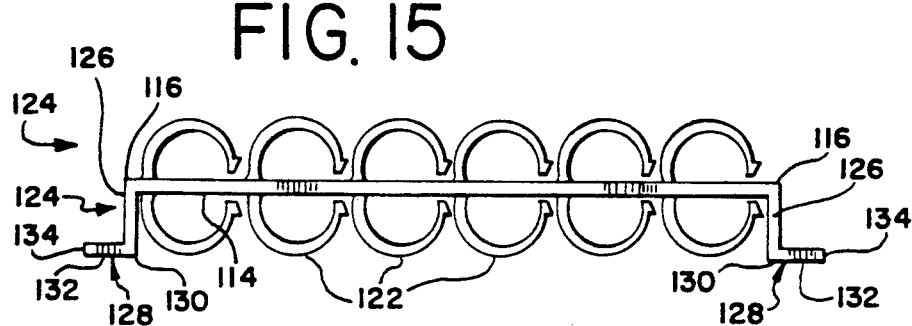
FIG. 15 is a top view of the embodiment shown in FIGS. 13 and 14.

FIGS. 13, 14, and 15 show a modified form of the invention for use with another typical wall panel system, i.e. Action Office Encore®, having an internal space where cables can be laid. This type of wall panel system is shown in a fragmentary perspective view in FIG. 10. A panel assembly, indicated generally at 100, has a panel 102 connected to a substructure 104. Substructure 104 defines an interior chamber 106 for storing a plurality of cables 140 and has a back wall 107 and a releasably secured front wall 108 for access to chamber 106. The cable management apparatus, indicated generally at 109, is shown seated within the interior chamber 106.

In this form of the invention, a plate 110 has a top surface 112, a bottom surface 114, side edges 116, a front edge 118, and a back edge 120. Retainer members 122 extend from both the top surface 112 and the bottom surface 114, although they need only extend from one surface. The configuration and orientation of the retainer members 122 are the same as described in the first preferred embodiment above, except there is no need to space apart rows 124 from the front edge 118 or the back edge 120. Rather than bending around a frame to reach the retainer members 122, cables 140 lie horizontally and can reach the retainer members 122 without substantial bending.

In this form of the invention, first flanges 126 depend from the side edges 116 of the plate 110 and extend below the lowermost portion of retainer members 122 so that the retainer members 122 do not contact a bottom wall of the substructure 104 or a floor. Horizontal flanges 128 extend outward from a bottom edge 130 of the first flanges 126 to provide a seat 132 which rests on a bottom wall of substructure 104 or a floor. Ends 134 of the horizontal flanges 128 engage the back wall 107 and the front wall 108, when the front wall is closed, to secure the cable management apparatus 109 within the interior chamber 106 of substructure 104. Horizontal flanges need not be provided, and the cable management apparatus 109 can rest on the bottom edges 130 of the first flanges 126, or any other type of legs.

In operation of all preferred forms of the invention, the apparatus is placed at a desired location within an interior chamber of a wall panel system, the clasps of the retainer members are opened, one or more cables are placed in each enclosure in a desired arrangement, and the clasps are closed and secured. Thus a simple, efficient apparatus for holding and separating a plurality of cables is provided to facilitate reassembly of the cables when reconfiguring a work station or changing the work processes of a given work station.

Although the present invention has been described with reference to preferred embodiments, workers skilled in the art will recognize that changes may be made in form and detail without departing from the spirit and scope of the invention. As such, it is intended that the foregoing detailed description be regarded as illustrative rather than limiting and that it is the appended claims, including all equivalents, which are intended to define the scope of the invention.

I claim:

1. In a panel assembly comprising a rectangular frame including vertical and horizontal frame members and a panel mounted on at least one side of said frame, the improvement comprising a cable management apparatus mounted within an internal space defined by said frame and panel, the apparatus comprising:

a retainer plate having a front surface, a back surface, a first side edge, a second side edge, a top edge, and a bottom edge;

a plurality of spaced apart retainer members extending outward from the front and back surfaces of the plate and being staggered such that a first row of retainer members on each surface is adjacent and parallel to the first side edge of the plate, and a second row of retainer members on each surface is adjacent and parallel to the first row and spaced apart from the second side edge of the plate so that bending of cables to reach the retainer members from around the frame is minimized, each retainer member defining at least a partial enclosure sufficient to prevent cables therein from slipping out laterally, and the distance between adjacent retainer members in each row being substantially the same as the length of a staggered retainer member in an adjacent row, resulting in a continuous series of unobstructed retainer members along the entire length of both surfaces of the plate, whereby the spaces between the retainer members in a row provide sufficient clearance for opening and closing each retainer member; and fastening means securing the plate to the panel assembly.

2. The apparatus of claim 1, wherein each retainer member is movable to allow insertion and removal of a desired number of cables, and includes locking means for releasably securing said retainer member in a closed position.

3. The apparatus of claim 2, wherein each retainer member comprises a rigid clasp, a hinge connected to one end of the clasp, and locking means adapted to secure the other end of the clasp.

4. The apparatus of claim 2, wherein each retainer member comprises a resilient clasp extending outward from a surface of the retainer plate and terminating in an end adjacent said surface to create a substantial enclosure, each retainer member being biased in a direction toward said surface of the retainer plate.

5. The apparatus of claim 4, wherein the retainer plate has a plurality of apertures formed therein, each aperture underlying a corresponding retainer member and being larger than said retainer member.

6. The apparatus of claim 5, wherein labels are placed on the front surface of the retainer plate adjacent the retainer members to allow ready identification of cables placed in the retainer members.

7. The apparatus of claim 6, wherein each retainer member is substantially semicircular and a tab extends outward from the end thereof, whereby the tab is pulled outward, cables are placed in the enclosure, the tab is released, and the clasp returns to its original position substantially enclosing the cables.

8. The apparatus of claim 7, wherein the retainer plate extends perpendicularly outward from the center of a support plate, the support plate having at least two anchors attaching the apparatus to a frame member of the panel assembly.

9. In a panel assembly comprising a rectangular frame including vertical and horizontal frame members and a panel mounted on at least one side of said frame, the improvement comprising a cable management apparatus mounted within an internal space defined by said frame and panel the apparatus comprising:

a support plate having at least two anchors for attaching the apparatus to a vertical support at a desired location;

a retainer plate extending perpendicularly outward from the center of the support plate, the retainer plate having a side edge opposite the support plate, a front surface, a back surface, a top edge, a bottom edge, and a plurality of apertures formed therein, each aperture underlying a corresponding retainer member; and a plurality of spaced apart, resilient, substantially semicircular clasps extending outward from the front and back surfaces of the retainer plate and terminating in an end adjacent said retainer plate to define a substantial enclosure, each clasp being staggered such that a first row of clasps on each surface is adjacent and parallel to the side edge of the retainer plate, and a second row of clasps on each surface is adjacent and parallel to the first row and spaced apart from the support plate, the distance between adjacent clasps in a row being substantially the same as the length of a staggered clasp in an adjacent row, each clasp being biased in a direction toward said retainer plate, whereby said terminal end of the clasps is pulled upward, cables are placed in the enclosure, the end is released, and the clasp returns to its original position substantially enclosing the cables.

10. The apparatus of claim 9, wherein the cable management apparatus is of one piece construction.

11. The apparatus of claim 10, wherein the retainer plate apertures are rectangular, substantially the same length as the retainer members, and wider than the retainer members to allow ready identification of cables which are placed in retainer members extending from the back surface of plate.

12. The apparatus of claim 11, wherein labels are placed on the front surface of the retainer plate adjacent the retainer members to allow ready identification of cables placed in the retainer members.

13. In a work space management system for dividing a space into separate work areas comprising at least two adjacent panel assemblies, each panel assembly comprised of a rectangular frame including vertical and horizontal frame members and a panel removably mounted on at least one side of each frame, the improvement comprising a panel assembly to panel assembly cable management apparatus mounted within an internal space defined by one of said frames and corresponding panel, said apparatus comprising:

a retainer plate;

means for attaching said retainer plate to one of said frames in a generally vertical orientation; and a plurality of retainer members extending from a surface of said retainer plate, each of said retainer members being adapted to removably receive a cable running generally horizontally through said internal space, said retainer members being arranged so as to hold a plurality of cables in a separated vertical stack within said internal space and whereby said plurality of cables passes through to the internal space of the adjacent panel assembly in the same separated vertical stack.

14. The apparatus of claim 13, wherein the retainer members extend from a front surface of the plate and a back surface of the plate to allow the cables to be wrapped around a front and rear portion of a vertical frame member, whereby the cables can be separated and organized from both the front and rear of the panel assemblies to accommodate workstations on both sides of the panel assemblies.

15. The apparatus of claim 3, wherein the retainer members are staggered to create a first and second row parallel to a side edge of the retainer plate and the distance between adjacent retainer members in a row is approximately the same as the length of a corresponding staggered retainer member in the other row.

16. The apparatus of claim 15, wherein each retainer member has a closed position and an open position adapted to allow lateral insertion and removal of a desired number of cables, and further includes locking means for releasably securing said retainer member in a closed position.

17. The apparatus of claim 16, wherein each retainer member and locking means comprises a resilient clasp biased in a direction toward said surface of the retainer plate and terminating in an end adjacent said surface to create a substantial enclosure.

18. The apparatus of claim 15, wherein the retainer members extend from front and rear surfaces of the plate in said staggered relationship, said retainer members on the back surface being offset from the retainer members on the front surface thereof such that each retainer member on said front surface is transversely aligned with a corresponding retainer member on said back surface, the retainer plate having a plurality of apertures formed therein, each aperture underlying a corresponding retainer member.

19. The apparatus of claim 18, further comprising labels placed on the front surface of the retainer plate adjacent the retainer members to allow ready identification of cables placed in the retainer members on the front and back surfaces of the plate.

20. The apparatus of claim 13, wherein each retainer member comprises a base having a top edge and a bottom edge, and a resilient clasp extending outward from the bottom edge of the base and terminating in an end adjacent the top edge of the base to create a substantial enclosure, the base being connected to the plate and the clasp being biased in a direction toward the top edge of the base.

21. The apparatus of claim 20, wherein the clasp is substantially semicircular and a tab extends outward from the end thereof.

22. The apparatus of claim 21, wherein the base has a lip protruding outward from the top edge thereof to retain the cables in the enclosure.

23. The apparatus of claim 22, wherein each tab has a surface facing the retainer plate which recedes at an angle away from the plate, and the base lip has a surface facing outward which recedes at an angle toward the enclosure, whereby a cable is forcibly slid into the enclosure between the tab and the base lip, and the clasp is forced outward during insertion and snaps back into place after insertion.

24. The apparatus of claim 13, wherein the apparatus is of one-piece construction.

25. The apparatus of claim 13, wherein the retainer plate has a flange extending from a side edge thereof, the flange having at least two apertures therein for receiving fastening means, whereby the plate is secured by the fastening means to a frame member of panel assembly having corresponding apertures.

26. The apparatus of claim 13, wherein the retainer plate extends perpendicularly outward from the center of a support plate, the support plate having at least two anchors for mounting said apparatus to a frame member of a panel assembly.

27. The apparatus of claim 13, wherein the retainer members are staggered to create a first and second row parallel to an outer edge of the plate, the first row being adjacent said outer edge and the second row being adjacent the first row such that both rows are spaced apart from the frame member to which the retainer plate is attached, whereby cables from an adjacent panel are wrapped around a frame member and held by the retainer members with a minimal amount of bending.

28. The apparatus of claim 22, wherein the retainer members extend from a front and back surface of the plate in said staggered relationship.

29. The apparatus of claim 27, wherein the distance between adjacent retainer members in a row is approximately the same as the length of a corresponding staggered retainer member in the other row.

30. The apparatus of claim 29, wherein each retainer member has a closed position and an open position adapted to allow insertion and removal of a desired number of cables, and further includes locking means for releasably securing said retainer member in the closed position.

31. The apparatus of claim 30, wherein each retainer member comprises a rigid clasp, a hinge connected at one end of the clasp, and the locking means is adapted to secure the other end of the clasp to the retainer plate.

32. The apparatus of claim 30, wherein each retainer member and locking means comprises a resilient clasp biased in a direction toward said surface of the retainer plate and terminating in an end adjacent said surface to create a substantial enclosure.

33. The apparatus of claim 32, wherein the resilient clasps are open toward the top to allow easy insertion of the cables and to prevent the cables from slipping out of the retainer members in a downward direction.

34. The apparatus of claim 32, wherein each clasp is substantially semicircular and a tab extends outward from the end thereof, whereby the tab is pulled outward, the cables are placed in the enclosure, the tab is released, and the clasp returns to its original position substantially enclosing the cables.

35. The apparatus of claim 34, wherein each tab has a surface facing the retainer plate which recedes at an angle away from the plate so that a cable can be forcibly slid into the enclosure between the tab and the plate, whereby the clasp is forced outward during insertion and snaps back into place after insertion.

36. In a panel assembly comprising a rectangular frame including vertical and horizontal frame members and a panel mounted on at least one side of said frame, the improvement comprising a cable management apparatus mounted within an internal space defined by said frame and panel, the apparatus comprising:

a retainer plate;

a first retainer member extending outwardly from a front surface of the plate and a second retainer member extending outwardly from a back surface of the plate, the first retainer member overlying a first aperture formed in the plate and the second retainer member overlying a second aperture formed in the plate, each retainer member defining at least a partial enclosure sufficient to hold a cable therein;

fastening means securing the retainer plate to an internal surface of the panel assembly.

37. The apparatus of claim 36 wherein the first and second apertures are approximately adjacent each other to allow a cable to be inserted through one of the first and second apertures while being held by the retainer member overlying the other of said first and second apertures aperture.

38. The apparatus of claim 37 wherein the apertures are horizontally aligned.

* * * * *